April 23, 1940.　　　　G. H. FRASER　　　　2,197,797
COUPLING OR CLUTCH
Original Filed Dec. 4, 1936　　4 Sheets-Sheet 1
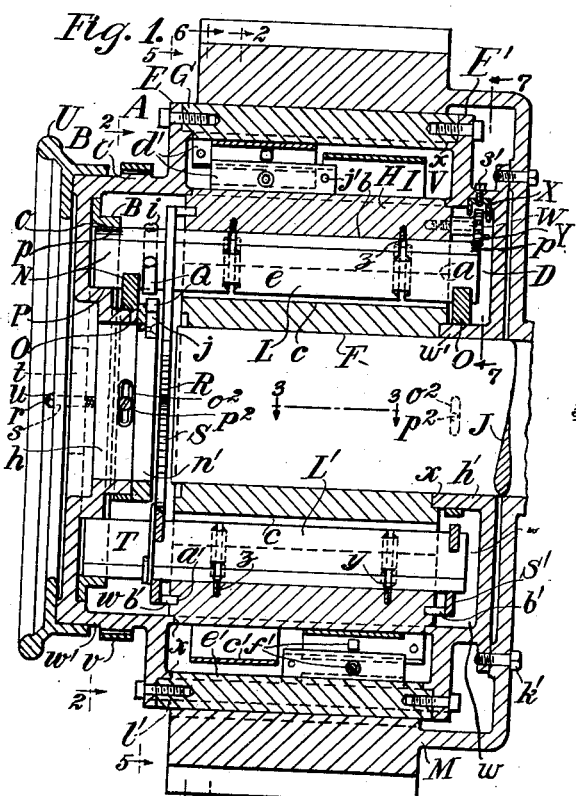
Fig. 1.
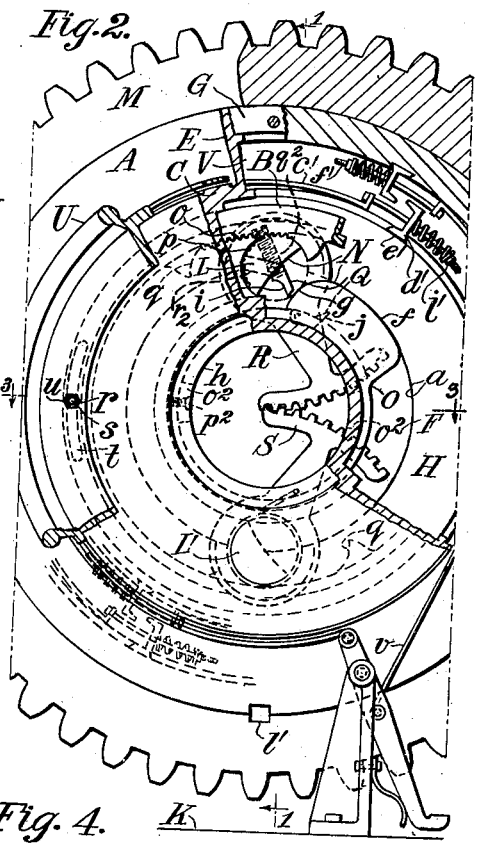
Fig. 2.
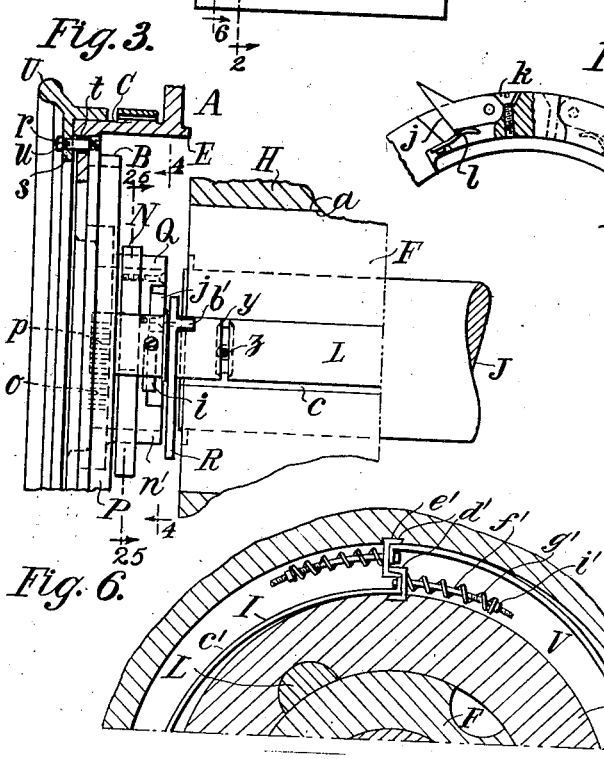
Fig. 3.
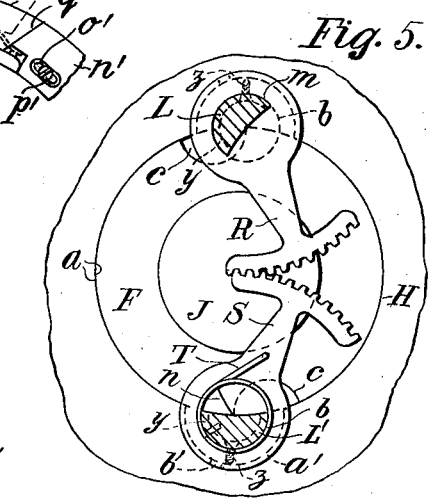
Fig. 4.
Fig. 5.
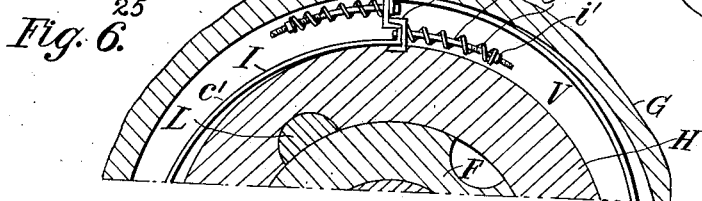
Fig. 6.
INVENTOR
George Holt Fraser April 23, 1940.　　　G. H. FRASER　　　2,197,797
COUPLING OR CLUTCH
Original Filed Dec. 4, 1936　　　4 Sheets-Sheet 2
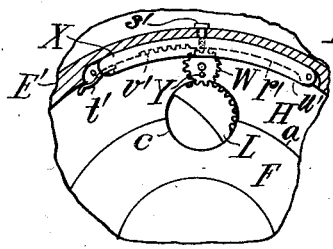
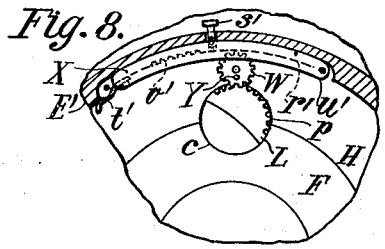
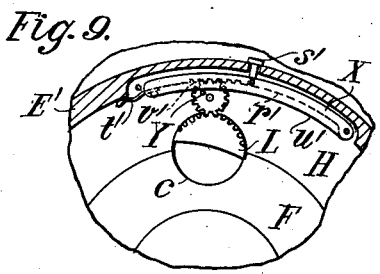
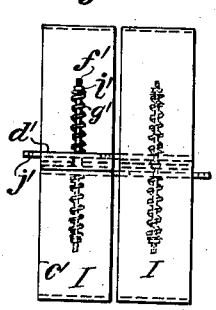
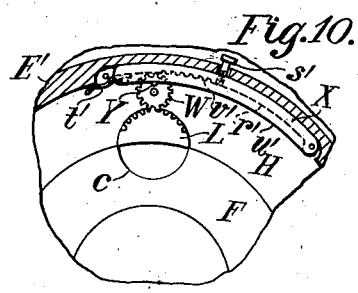
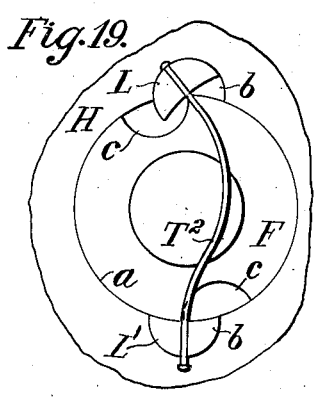
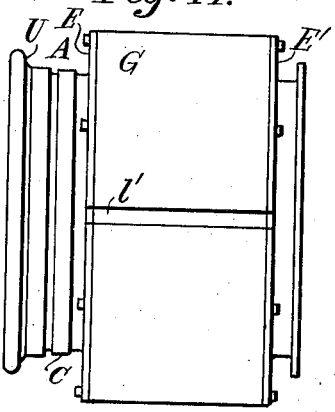
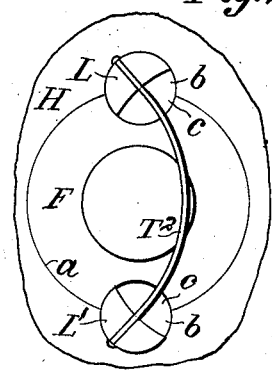
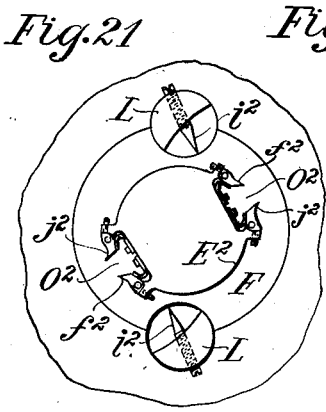
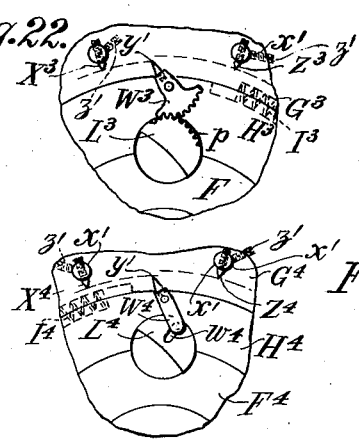
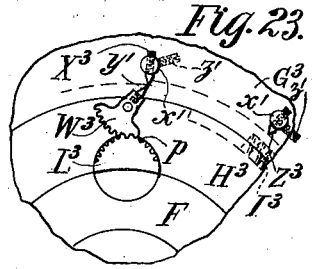
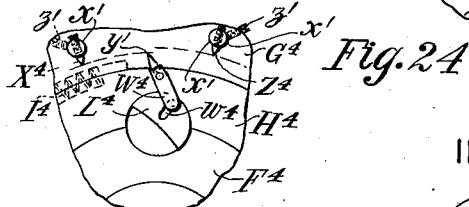
INVENTOR
George Holt Fraser April 23, 1940.  G. H. FRASER  2,197,797
COUPLING OR CLUTCH
Original Filed Dec. 4, 1936   4 Sheets-Sheet 3

INVENTOR
George Holt Fraser

April 23, 1940.  G. H. FRASER  2,197,797
COUPLING OR CLUTCH
Original Filed Dec. 4, 1936   4 Sheets-Sheet 4

INVENTOR
George Holt Fraser

Patented Apr. 23, 1940

2,197,797

UNITED STATES PATENT OFFICE 2,197,797

COUPLING OR CLUTCH

George Holt Fraser, Brooklyn, N. Y.

Application December 4, 1936, Serial No. 114,246
Renewed July 18, 1939

32 Claims. (Cl. 192—56)

This invention relates to couplings or clutches for transmitting rotary motion and for controlling such transmission, and especially to torque responsive clutches.

In my original application Serial No. 610,807, filed January 12, 1932, of which this application is in part a continuation, I have shown a torque responsive clutch comprising a rotatable driving member, a driver member therein, one of said members movable relatively to the other, a yieldable connection between said driving member and said driver member, designed to transmit a normal torque load, a driven member rotatable with said driver member during said transmission, said driver member and said driven member having reciprocal peripheral faces having a semi-cylindrical keyseat in said driver member and a reciprocal semi-cylindrical keyway in said driven member, oscillatory clutch means having a semi-cylindrical transmission portion oscillatory about an axis in said keyseat for terminating said transmission, and having a flatter portion coincident with said peripheries during said termination, and oscillatory across said peripheries and into said keyway, for effecting said transmission, key operator means carried by and rotatable with said driving member and in communication therefrom across said peripheries and said axis to inwardly thereof, said key member movable relatively to said operator means upon overload of said yieldable connection, said key member having an oscillator projection extended inwardly from its flatter portion and disposed inwardly thereof transversely across the path of rotation of said operator means, and movable upon overload into operative relation with said operator means and swung out of such path by its movement relatively to said operator means upon said overload, for oscillating said semi-cylindrical transmission portion reversely to the direction of torque and out of transmission engagement upon overload of said yieldable connection, and for permitting continued rotation of said operator means without molestation of said oscillator projection after said termination of said transmission; and in my said application I have claimed said construction and have generically claimed reciprocal torque responsive oscillation provisions operable to oscillate the semi-cylindrical transmission portion of a transmission key member in a direction reverse to the direction of torque.

In my said construction the driver member, the clutch means, and the yieldable connection were carried by the driving member and continued to rotate therewith after transmission was terminated, which necessitated engagement manipulation of the clutch means during rotation thereof, or stoppage of rotation of the driving member for adjustment of the clutch.

In my said construction the key member might be torque oscillated into a partially engaged drive position during a surge of torque, and might continue transmission without being returned to its normal transmission engagement position, a condition which might impair the clutch means following minor torque oscillation of the key member, and requiring manual manipulation for resetting the key member in its normal drive engagement position.

My original invention as originally set forth in my said original application included as part thereof said construction and said improvements claimed in my said original application; and also included as other features thereof mounting the driver member and the clutch means and the yieldable connection and the clutch operator means on a driven member, torque oscillating a transmission key member in either direction, torque responsive oscillation of the key member outwardly of its axis, and torque responsive oscillation of an over-run prevention key member reversely to oscillation of a transmission key member, which features are not specifically claimed in my said original application.

My present application aims to protect said other features of my said original invention, and to provide a torque responsive clutch which may be non-rotary after transmission is terminated, and in which the key member may be torque oscillated into its drive disengagement position upon overload or toward said position during minor increases in torque, and may be counter-torque oscillated toward its normal drive engagement position during diminution of torque, and may be torque oscillated and counter-oscillated from inwardly of or without its axis, and which may be manually manipulated while it is not rotating.

To this end in carrying out the preferred form of said features of my said original invention to which this application pertains, I mount the driver member and the clutch means and the clutch operator means on the driven member, and dispose the yieldable connection between and in operative relation to the driver member and the driven member, and dispose the clutch means between the driver member and the driving member, in such manner that during transmission the yieldable connection may permit the driven member and the operator means to yieldably move relatively to the driver member and the clutch means, for oscillating the latter during torque surges and drivingly disengaging it and terminating transmission upon overload, so that upon termination rotation of the clutch will cease and manipulation of it will be facilitated; and I provide improved oscillation provisions between the transmission key member and the clutch operator which are coincident with the periphery of the driver member and designed to use the flatter portion of a conventional semi-cylindrical key as one of these provisions; and I provide these provisions with a cam portion designed to graduate torque oscillation of the key member and to vary the effective leverage available for such oscillation; and I provide counter-oscillation means for the key member, designed to counter-oscillate it toward its normal drive engagement position after it has been torque oscillated therefrom; and I provide torque oscillation and counter-oscillation provisions both inwardly and outwardly of the axis of the key member, which may be alternatively used for oscillating it; and I dispose the yieldable connection within a driven member and around a driver member and axially removably mounted in an annular chamber between these; and I enclose the members, clutch means, clutch operator means and yieldable connection between axially spaced operator means affording therewith a self-contained torque clutch assembly; and I provide a torque operated over-run prevention key member in yieldable operative relation to a transmission key member; and I provide reversible torque oscillation means and yieldable connection means which may be used with either direction of torque, and make these circumferentially adjustable; and I provide various other features of improvement all of which will be more fully hereinafter set forth with reference to the accompanying drawings.

In the accompanying drawings, which illustrate the preferred utilization of my improvements, and some modified forms for availing in part thereof:

Fig. 1 is a fragmentary vertical and substantially axial section, cut in part approximately on the plane of the line 1—1 in Fig. 2 and looking in the direction of the arrows on said line, of my improved clutch showing the parts of the clutch in their positions of drive engagement;

Fig. 2 is a fragmentary end elevation thereof, partly broken away and partly in vertical transverse sections cut respectively approximately on the planes of the lines 2—2 in Fig. 1 and looking in the direction of the arrows on said lines, the parts being shown in said positions;

Fig. 3 is a fragmentary horizontal axial section thereof, partly cut approximately on the plane of the lines 3—3 in Figs. 1 and 2 looking in the direction of the arrows on said lines, and showing the parts in said positions;

Fig. 4 is a fragmentary vertical transverse section thereof, cut approximately on the plane of the lines 4—4 in Fig. 3 and looking in the direction of the arrows on said lines, showing the re-setter in full lines, in its position in Fig. 2, and in dotted lines in its reverse position;

Fig. 5 is a fragmentary vertical cross section thereof, cut approximately on the plane of the line 5—5 in Fig. 1, but showing the over-run prevention key member out of engagement until its keyway has attained coincidence with its keyseat;

Fig. 6 is a fragmentary vertical transverse section thereof, cut approximately on the plane of the line 6—6 in Fig. 1, but showing the transmission key member in drive disengagement position, and the yieldable connection in its no torque position;

Fig. 7 is a fragmentary vertical transverse section thereof, cut approximately on the plane of the line 7—7 in Fig. 1 and looking in the direction of the arrows on said line, and showing the outer alternative oscillation provisions in their positions when out of operative relation to the key member;

Fig. 8 is a similar fragmentary vertical transverse section thereof, cut approximately on the line 7—7 in Fig. 1 and looking in the direction of the arrows on said line, but showing the outer alternative oscillation provisions in position for oscillating the key member and just before torque is sufficient to oscillatorily engage it;

Fig. 9 is a similar fragmentary vertical transverse section thereof, cut approximately on the line 7—7 in Fig. 1 and looking in the direction of the arrows on said line, but showing the outer alternative oscillation provisions in oscillatory operative relation for oscillating and counter oscillating the key member during increase and diminution of torque prior to overload;

Fig. 10 is a similar fragmentary vertical transverse section thereof, cut approximately on the line 7—7 in Fig. 1 and looking in the direction of the arrows on said line, but showing the outer oscillation provisions in their no torque positions;

Fig. 11 is a side elevation of my torque responsive clutch means as an article of manufacture;

Fig. 12 is a plan view of my improved yieldable connection as a new article of manufacture;

Fig. 19 is a diagrammatic end view of a transmission key member entering drive engagement position, and an over-run prevention key member prevented from engagement pending coincidence of its keyway, showing a modification of my yieldable operative connection between such members;

Fig. 20 is a similar view, but showing both key members in engagement and the position of their connection after they are both engaged;

Fig. 21 is a fragmentary diagrammatic end view of a pair of similar transmission key members, showing a modification of my torque responsive oscillation and counter-oscillation means therefor;

Fig. 22 is a diagrammatic end view of a transmission key member in its drive engagement position, showing a modification of my torque oscillation provisions outwardly of its axis;

Fig. 23 is a similar view showing the transmission key member in its drive disengagement position and the outer torque oscillation provision in position just upon oscillating the key member out of drive engagement upon overload;

Fig. 24 is a fragmentary diagrammatic end view of a transmission key member in its drive engagement position, showing a modification of my torque oscillation provisions outwardly of its axis in a construction in which the driver member is encircled by a driving member and encircles the driven member;

Figure 25:
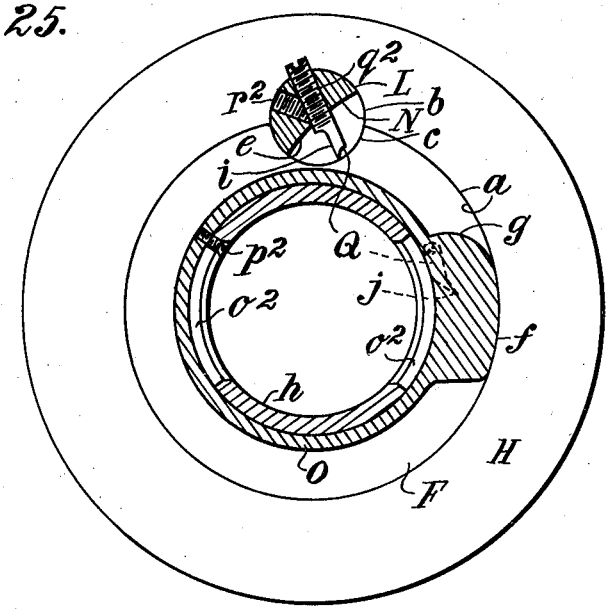
Figure 26:
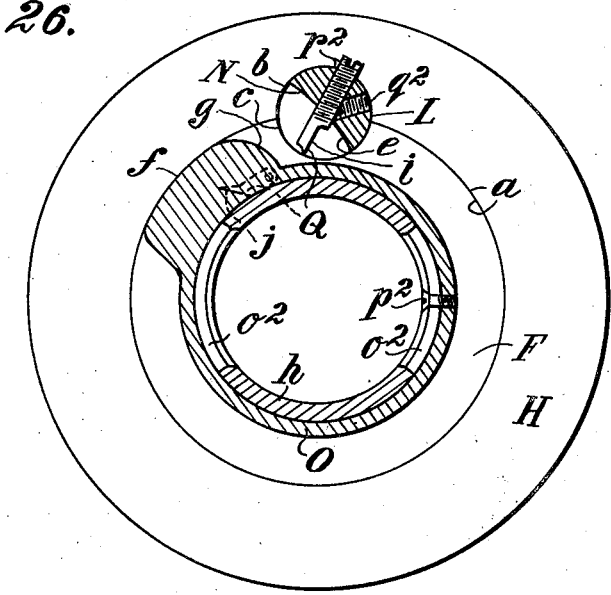

Fig. 25 is an enlarged fragmentary end elevation of the driver and driving members and vertical cross-section of the transmission key member and of its oscillator and of the hub on which the latter is mounted, the view being cut approximately on the planes of the line 25—25 of Fig. 3 and looking in the direction of the arrows on said line, but showing the oscillator in its position when adjusted out of operative relation to the key member, and Fig. 26 is a view similar to Fig. 25, but showing the transmission key member and its operator in the positions they occupy when their oscillation provisions are reversed for the transmission and control of transmission of torque counter to the clockwise torque for use with which they are shown as arranged in Fig. 2.

Referring to Figs. 1 to 18, both inclusive, of the drawings, let A indicate a torque responsive clutch as a whole, for transmitting rotation and for torque control of such transmission, B manual or other drive engagement means thereof, for starting such transmission, C manual drive disengagement means thereof, for terminating such transmission, D clutch means thereof, for controlling such transmission, E clutch operator means thereof, for operating said clutch means, F and G drivingly engageable and disengageable members thereof, one a driving member for transmitting rotation thereto and the other a driven member for transmitting rotation therefrom, H a driver member revoluble with said members and as to which one of said members is circumferentially movable during said transmission, and I a yieldable drive connection I, designed to transmit a normal load, in operative relation to said driver member and said driven member, for transmitting rotation therebetween and permitting relative movement with variations in torque, for control of said transmission.

These parts may be of any usual or suitable construction for the torque control of transmission by means of a torque responsive clutch operator which is operable to move the clutch out of drive engagement upon overload, and may be applied to or used in connection with a pair of transmission provisions, for torque control of transmission from one to the other.

In the construction shown the member F is shown as serving as a driving member and as removably fitted over and keyed to the end of a driving shaft or transmission member J of an engine or motor K, and the member G is shown as serving as a driven member, and is shown as bolted and removably keyed to a driven gear M of such an engine or motor.

In this construction the member F when fixed on the end of the shaft J serves as a complementary part or enlargement of the end of the latter, and provides for radially spacing the clutch means therefrom, and for manipulating the clutch means from radially outwardly of the periphery of the shaft J.

The manual manipulator B is shown herein as an annular member revoluble with and oscillatory relatively to the operator E, and as connected to the clutch means D for manually effecting drive engagement of the latter, for starting transmission.

The manual manipulation means C is shown as an annular brake provision in operative relation to the operator E, and through it to the clutch means D and the yieldable connection I, for retarding the operator by increasing torque until the operator is effective to operate the clutch means, for stopping transmission.

The member F and the driver H are shown as concentric annular sleeves, one revolubly fitted within another, and each having reciprocal bearing faces, as the peripheries a, having semi-cylindrical axially extended keyseats b in the driver H, and reciprocal semi-cylindrical keyways c in the member F.

The clutch means D is shown as comprising an oscillatory key member L, having a semi-cylindrical transmission portion d oscillatory about an axis in a keyseat b for terminating transmission, and having a flatter arc shaped or concave portion e, coincident with the peripheries a during such termination, and oscillatory across said peripheries and into a keyway c for effecting transmission.

The member G is shown as an annular driven member around and revoluble with and movable relatively to the driver H during transmission, and as yieldably connected to the driver H by the yieldable connection I which is for yieldably transmitting torque between the driver H and the member G and permitting their circumferential movement during said transmission.

The clutch operator E is shown as revoluble with and circumferentially movable relatively to the driver H during transmission, and as removably fixed to the member G, and movable with the latter and relatively to the driver H upon yield of the yieldable connection I, and as in operative relation to the key member L for operating the latter coincidently with said relative movement.

In the construction shown the operator E and key member L are provided with reciprocal key oscillator inner provisions N, interengageable during relative movement of the operator and key member, and operable during overload to oscillate the transmission portion of the key member reversely to the direction of torque and into drive disengagement position, for terminating transmission upon overload, on the principle claimed in my said original application Serial No 610,807.

According to one feature of the preferred form of my present invention the operator E is fixed to and revoluble with the driven member G, instead of being fixed to the driving member F as shown in my said application, and carries the starter B, driver H, key member L, stop provision C, yieldable connection I, and oscillation means N, in such manner that when transmission is terminated rotation of these parts is also terminated, instead of being continued as in the construction shown in my said application. By this arrangement the starter B is stationary during termination, so that it may be easily manually manipulated before transmission is started, and continued rotation of the input transmission member J or the driving member F need not be affected by termination of transmission through the clutch A, so that the latter may be drivingly disengaged without stopping rotation of the engine or motor, and may be drivingly engaged during such rotation and while the clutch means D is not rotating.

According to another feature of my present invention the operator E is disposed at one side of the clutch D, and comprises a supplementary operator E' at the other side thereof, and the oscillation provisions N are preferably duplicated at each end of the key member L, for insuring parallel oscillation of the latter. As shown this is accomplished by constructing the operators E and E' as annular members extended from the ends of the driven member G across and revolubly connected to the ends of the driver H, past the ends and across the axis of the key member L, and having inner peripheries in coincidence with the inner periphery of the driving member F, to which the operator E' is shown as revolubly connected in such manner that the transmission shaft J may be slid in or through said inner peripheries and fixed or keyed to the driving member F and will revolubly sustain the operator E' when the clutch A is applied to such shaft, and the operator E' will concentrically position and connect the driving member F, driver H, and driven member G and the operator E, in their proper relations when the operators E' and E are fixed to the ends of the driven member G.

According to another feature of the preferred form of my present invention the oscillation provisions N, disposed at the inner side of the axis of the key member L, are both in coincidence with the peripheries a of the members F and H when transmission is terminated, and one is oscillatory across said peripheries for effecting said transmission, and into coincidence with said peripheries for terminating it and for then permitting relative circumferential movement or revolution of said provisions without molestation of either by the other. For accomplishing this I preferably use the flatter or concave face e of the key member L as one of the oscillation provisions N, and provide an arc shaped face f, concentric with and of the same radius as the peripheries a, as the other of the provisions N, and so disposed these that as the arc shaped face f attains coincidence with the axis of the key member L it will, by co-operable engagement with the face e of the latter, cause the key member to oscillate into its drive disengagement position, and will then arrest further such oscillation. The provisions e and f are shown as disposed at the inner side of the axis of the key member L and as co-operable in such manner that as they engage in the direction of torque they co-operate to oscillate the transmission portion of the key member reversely to said direction, and thus afford in effect a reverse motion connection between the clutch operator and clutch means, operable to translate torque stress in one direction into clutch operation in reverse direction, for terminating transmission of such torque. This construction gains the advantage that the flatter side of a conventional semi-cylindrical key may be used as its oscillation provision.

According to another feature of the preferred form of my invention I provide for modification or graduation of torque oscillation of the key member L, and for variation of the leverage or force required to effect successive portions of such oscillation, by making one of the oscillation provisions N with a cam portion g, initially engageable with the lower edge of the provision e, and successively engageable with successive portions of the latter as the key member and the cam approach, the contour of the cam being adapted to effect the graduation of oscillation of the key member which may be desired.

According to another feature of the preferred form of my invention I provide for circumferential adjustability of the oscillation provisions N by making one circumferentially adjustable relatively to the other, which is accomplished in the construction shown by forming the provisions f and g on members O, which are shown as annular and adjustably mounted around hubs h or h' carried by the operators E and E' respectively, and as adjustably connected thereto by a slot o2 and screw p2 connection, in such manner that these members O will move with the operators E and E' but can be adjusted circumferentially thereof relatively to the member L, for varying torque operation, or out of operative relation to the key member L, for discontinuance of torque operation of the latter from inwardly of its axis, as shown in Fig. 25.

According to another feature of the preferred form of my invention I use the oscillation provisions N with either direction of torque, and this is accomplished in the construction shown by making the cam rings O reversible on the operators E and E', whereby in this construction, reversal of torque may be provided for by merely reversing the cam rings O and by oscillating the key member L so that its arc shaped face e will be reciprocal to the reverse position of the cam face g on the rings O when the latter are reversed, as shown in Fig. 26.

According to another feature of the preferred form of my invention I provide for limiting and defining the engaging movement of the key member L by the starter B or operator E, and this is accomplished as shown by providing the circular key check or limiter P, on the periphery of the hub h of the operator E and of such diameter that it extends in the path of the inner edge of the key member L and defines the normal transmission engagement position of the key member by utilizing the operator E to limit engagement oscillation of the key member L during either direction of torque.

Another feature of improvement shown in the preferred form of my invention provides for resetting of a torque operated key member, for restoring it to its normal drive engagement position after it has been partially oscillated therefrom by a minor surge of torque during sub-overload, and for oscillating it counter to torque and to its overload operator, and this I accomplish in the construction shown by providing co-operable counter-oscillation provisions Q in operative relation to the key member L and the operator E, and operable during their relative movement coincident with diminution of torque to oscillate the key member toward its normal drive engagement position, and disengageable or movable out of co-operable operative relation when the key member is moved into its drive disengagement position, whereby the key member may be reset during transmission without molestation by the re-setter after transmission is terminated.

Figure 13:
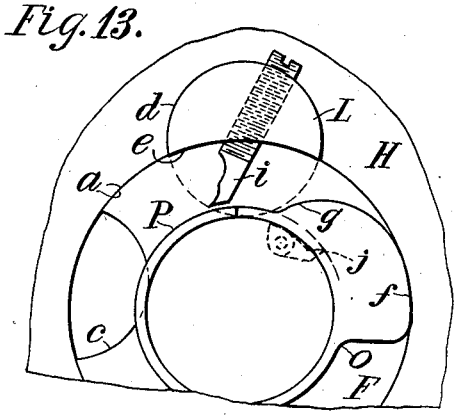
Fig. 13 is an enlarged diagrammatic end view, showing the upper transmission key member in its unclutched position, and its engagement limiter, its torque responsive operator, and its torque responsive re-setter, in their no torque positions.
Figure 14:
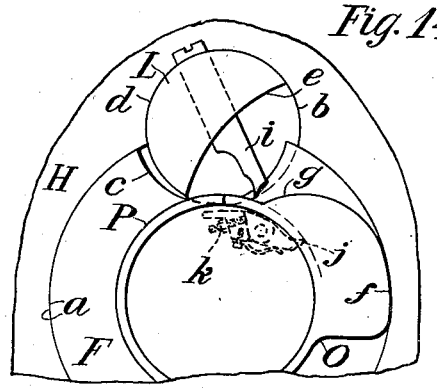
Fig. 14 is a similar diagrammatic view, but showing the transmission key member arrested in its drive engagement position by its limiter.

As shown this is accomplished by providing the key member L with pin i, and the operator E with a nose j, and by making each of these oscillatory through an arc intersected by an arc of oscillation of the other, when they are disposed inwardly of the axis of the key member, on the principle shown diagrammatically in Figs. 13 to 18, both inclusive, in which Fig. 13 shows the position of the pin $i$, and nose $j$ when all the parts are stationary, or during no transmission, when all the parts except the driving member F are stationary from which it will be seen that the nose may with the member F rotate, if from any cause the member F rotates, without molestation by the nose $j$ of the pin $i$ of the key member L, or the driver member H may for any purpose be rotated and rotate the key member L with it without molestation by the pin $i$ of the nose $j$, the pin and the nose being in their inoperative positions incident to no transmission. By reference to Fig. 14, in which the key member L is shown as just arrested in its engagement position by contact of its lower edge with the key check P, and the nose $j$ is shown as still in its no torque position, it will be seen that the pin $i$ has passed beyond the adjacent intersection of the arc through which the pin swings and the arc through which the nose swings, and is just out of the path of the latter, so that when torque moves the nose it may pass under the pin without molesting it or the key member L.

Figure 15:
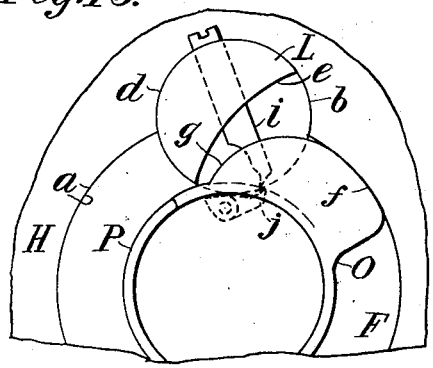
Fig. 15 is a similar diagrammatic view, but showing the torque responsive parts when moved by torque into operative relation to the drivingly engaged transmission key member.

By reference to Fig. 15 which shows the key member L locked and transmitting torque sufficient to move the nose $j$ past the pin $i$ it will be seen how these clear each other for attaining their co-operative engagement positions as torque increases.

Figure 16:
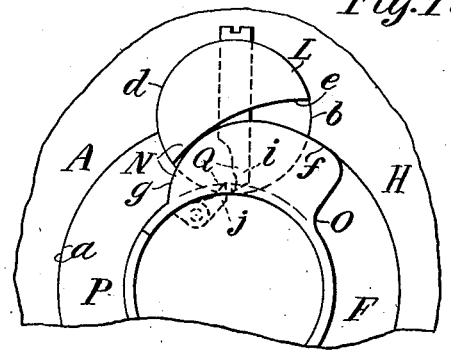
Fig. 16 is a similar diagrammatic view, but showing the transmission key member when oscillated towards its disengagement position by the torque operator.

By reference to Fig. 16, which shows the key member L being oscillated by a torque surge, it will be seen how the nose $j$ is in position for counter-oscillation engagement with the pin $i$, and for counter-oscillating the key member L with diminution of torque.

Figure 17:
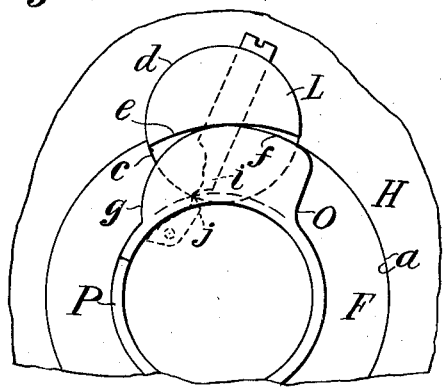
Fig. 17 is a similar diagrammatic view, but showing the transmission key member when oscillated by the operator until the key member is almost out of drive engagement and has just passed out of operative relation to the re-setter.

By reference to Fig. 17, which shows the key member L almost unlocked by torque, it will be seen how its pin $i$ and the nose $j$ are passing out of operative relation, so that each may be free from engagement with the other before the instant of complete drive disengagement of the key member by overload.

Figure 18:
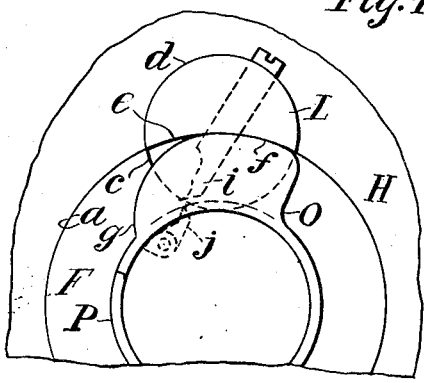
Fig. 18 is a similar diagrammatic view, but showing the transmission key member in its position at the instant of its drive disengagement.

By reference to Fig. 18, which shows the key member L at the instant of its drive disengagement and before termination of torque has restored the nose $j$ to its no torque position, it will be seen how the nose $j$ is free to return to the latter position without molestation of or from the pin $i$, and hence without re-engaging the key member L.

By this arrangement the key member may be manipulated without molestation from its counter-oscillator until torque moves the latter into operative relation to the pin $i$ after which the counter oscillation will restore the key member to its normal drive engagement position after each minor oscillation of it by a surge of torque, but will become inoperative to counter-oscillate the key member when the latter has been disengaged by overload.

The nose $j$ is spaced in lost motion operative relation to the pin $i$ such distance as is desired for its inoperative movement with minor torque, and with precision construction both the pin $i$ and the nose $j$ may be fixed, but according to another form of my invention as shown adjustability is provided for one or both, as by adjustably screwing the pin $i$ through a hole $q2$ in the key member L and adjustably and yieldably mounting the nose $j$ on the hub $h$ of the operator E, so that its radial projection may be adjusted as by a screw $k$ and it may be radially outwardly yieldably held as by a spring $l$.

Another feature of improvement shown in the preferred form of my invention provides for resetting a torque operated key member during either direction of torque, and this is accomplished in the construction shown by providing the key member L with a screw threaded hole $r2$ suitably inclined relatively to the hole $q2$ to correctly position the pin $i$ for engagement with the nose $j$ when the latter has been shifted to its reverse position shown in dotted line in Fig. 4 and by unscrewing the pin $i$ from the hole $q2$ and screwing it into the hole $r2$ when the key member is oscillated into position for co-operating with the cams $g$ of the rings O when the latter have been reversed in their position on the hubs $h$ and $h'$, in which case the flat side of the point of the pin $i$ will be turned in the reverse direction to that shown in Fig. 2, and will occupy the position shown in Fig. 26.

Referring again to Figs. 13 to 18, both inclusive, the co-operative relation of the oscillation provisions N and the counter-oscillator Q are diagrammatically approximately indicated, from which it will be seen that, depending on the curvature desired for the cam portion $g$, and the nature of the cam $e$ on the key member L the initial portion of the cam portion $g$ should be circumferentially spaced from the nose $j$ enough to permit the cam portion $g$ to attain oscillatory engagement with the key just after the nose $j$ has passed into position for engagement with the pin $i$, and the conformation of the engagement face of the latter and of the engaged faces of the cam portion $g$ and the provision $e$ should be such as to permit the desired oscillation and counter-oscillation of these, and the desired lost motion between them, for avoiding interference of one with another, and precluding any cramping during their co-operable action. As shown the inner face of the pin $i$ is slightly curved, and the curvature of the cam portion $g$ is designed to initially engage the edge of the key member L so that it may exert relatively great leverage against the latter, and to successively engage successive portions of the face $e$ in such manner that it will graduate oscillation of the key member L to suit that desired and to suit that best suited to oscillation and counter oscillation by the nose $j$, up to the time when the concentric cam portion $g$ of the cam ring O attains coincidence with the axis of the key member L, whereupon this concentric cam portion quickly oscillates the key member into complete drive disengagement position, and arrests it in such position for the instant before the yieldable connection I restores the cam member to its no torque position, at which instant an edge of the periphery $a$ of the member F adjacent the keyway $c$ is moved, by the rotation of the member F, under and engages the edge of the key and holds it against re-setting until the periphery $a$ of the member F has restrained the key member in its drive disengagement position.

When it is desired that the torque oscillation provisions N and the counter-oscillation provisions Q shall the one be circumferentially adjustable relatively to the other my invention provides for this in the construction shown by utilizing the described circumferential adjustability of the cam ring O, for circumferentially adjusting it relatively to the nose $j$, whereby the space between the latter and the cam portion $g$ may be varied as desired.

According to another feature of its preferred form as shown, my invention provides for resisting overrun of a driver member, as H, and a driven member, as G, with respect to a driving member as F during transmission, as shown by providing diametrically opposite keyseats b in the driver H and keyways c in the driving member F, and providing an over-run prevention key member L' diametrically opposite and yieldably operative from the key member L, in such manner that the key member L' will be oscillated reversely to the key member L and will be yieldably connected thereto in such manner that engagement oscillation of the key member L' may be deferred until its keyway c has attained coincidence with its keyseat b, whereupon it may enter the latter and resist over-run or chatter. By this arrangement the over-run key member is torque operated and is made torque responsive, and its yieldable connection provides tolerance pending such coincidence, so that it may oscillate with the transmission key member L during transmission, while the key member L may be oscillated toward its drive engagement position before the key member L' engages.

As shown this is accomplished by fixing a geared sector or similar provision R on the key member L, and oscillatorily mounting a geared sector or similar provision S on the key member L', and connecting the latter with the sector S by a yieldable connection T shown as a spiral spring, arranged in such manner that it will yield, as the sectors R and S are oscillated by movement of the key member L toward its drive engagement position, and thus will permit the key member L' to ride on the periphery a of the driving member F until the approaching keyway c coincides with the keyseat b of the key member L' and permits over-run prevention engagement of the latter.

As shown the sector R has a crescent shaped aperture m coinciding with the cross section of and removably slid on the key member L, and the sector S has a clearance aperture n removably slid over the key member L' in such manner that the latter can be oscillated in said aperture and relatively to the sector S by the spring T, and thus will not resist manual engagement of the key member L during approach of its keyway c, so that the key member L may be oscillated toward its engagement position as soon as the adjacent edge of its keyway c has attained coincidence with the axis of the transmission key member and without waiting until the diametrically opposite keyway c has attained coincidence with the diametrically opposite seat b.

According to another feature of its preferred form as shown my present invention provides for operation of the limiter P, oscillation provisions N, counter-oscillation provisions Q, and over-run prevention key member L', or any two of them, without interference of one with another or others, and accomplishes this as shown by disposing these in axially spaced relation. As shown the key limiter P is adjacent the end of the key member L, the cam ring O is disposed next inwardly thereof, the re-setter provisions Q are disposed inwardly of the ring O, and the over-run prevention means R and S are disposed inwardly of the re-setter provisions and between the latter and the adjacent end of the driver H, so that each is free to function in a zone axially spaced from the others, and may operate inwardly of the axis of the key member L without molestation inwardly thereof by another.

According to another feature of its preferred form the present invention disposes the manual starter B within, and in communication from within to without, the operator E, and encircles it by the latter and the brake provision C thereof, and rotates it by carrying the starter from the driven member G, in such manner that the starter needs to rotate only during transmission, as distinguished from that without the operator and rotatable with a driving member of my said original application. As shown this is accomplished by making the starter B as a ring oscillatorily mounted within the operator E and extended around the external peripheries of the key members L and L', as to which it is circumferentially oscillatory, and with the key member L of which it is in operative relation by means of any suitable reciprocal provisions on it and this key member, such, for example, as those shown, which comprise a toothed rack o on the ring B, and a gear or teeth p on the key member L, in such manner that as the ring B is oscillated it will oscillate the key member from its drive disengagement position, toward its drive engagement position, for starting transmission.

The ring B is shown as formed with an internal notch q which embraces the key member L with sufficient clearance to permit oscillation of the ring and of suitable length to limit such oscillation toward drive engagement position in either direction, so that the ring B may be used for oscillating the key member L to suit either direction of torque. The ring B is shown as neutral or in inoperative relation to the key member L', and does not molest the yieldable operation thereof.

For facilitating its manual manipulation during operation the ring B is in communication with the operator E as by being provided with a hand wheel U, shown as against the end of the operator E and oscillatorily mounted thereon by embracing the outer periphery thereof, which hand wheel and the ring B are connected to oscillate together by any suitable axially separable engagement provisions extended from within to without the operator E, such as a projection r carried by the one and slidable through a notch or hole s provided in the other, and oscillatory in a recess or slot t formed in the operator E and of sufficient length to permit oscillation of the wheel U for engaging the key member L for either direction of torque.

The wheel U and ring B are shown as axially connected and positioned on the operator E by means of a removable and adjustable nut u, by which frictional engagement with the operator and x resistance to accidental or torsional operation may be adjusted, and both the ring B and wheel U are responsive to the torque oscillator for the key member L, and are torque oscillated thereby reversely to torque oscillation thereof and coincidentally with oscillation of the key member in either direction.

By this arrangement, as the wheel U does not rotate when transmission is terminated, it can be easily manipulated to drivingly engage the key member L for starting transmission, after which the wheel rotates itself out of the grasp of its manipulator, and will revolve with the operator E.

According to another feature of its preferred form my present invention disposes the manual stopping provision C on the operator E so that it may be stationary when transmission is terminated, and this is accomplished in the construction shown by making the provision C as an annular circumferential brake surface on the operator E, which is shown as surrounded by and in cooperable relation to a foot operated brake band or other manually operable retarder means $v$, by applying which rotation of the driven member G may be sufficiently resisted to increase torque sufficiently to cause the operator E to drivingly disengage the transmission key member L for manually terminating transmission whenever desired. As shown the brake provision C and the starter B are disposed in spaced relation and independently operable, as by axially spacing the provision C inwardly of the wheel U, and by mounting the ring B concentrically inwardly of the provision C.

According to another feature of its preferred form the present invention provides for enclosing the key members and oscillation provisions within the operators E and E', and this is accomplished by forming each operator as an annular hollow sided member having an annular chamber $w$ extended around the hubs $h$ and $h'$ and receiving and enclosing the ends of the key members L and L' and the oscillation provisions therefor, which chamber is formed in reduced portions or drums $w'$ on the periphery of one of which the provision C is formed and the hand wheel U is mounted, and of which the hub $h$ is shown as an integral part. In such construction the operators E and E' serve as connectors for the driving member F, driver H, and the driven member G, and as a radial spacer means for radially spacing the latter from the driver H, for which purpose the driver and these members are formed with reciprocal interengaged spacer provisions $x$ by which they are concentrically disposed and on which the driving member F may rotate relatively to the driver H when transmission is terminated, but it and the driver H may move relatively to the operators and the driven member G during transmission. This arrangement makes it possible to enclose and operate all the internal parts within the driven member G and between the operators E and E'.

According to another feature of its preferred form the present invention mechanically retains the key members L and L' in their keyseats, and separably connects the key members to the driver H, by one or more circumferentially oscillatorily engageable overhung retention provisions oscillatory out of engagement coincidence for permitting axial removal of the key member, and this is accomplished in the construction shown by providing each key member with one or more circumferentially extended undercut peripheral grooves $y$, and its keyseat with one or more radial projections of screws $z$ embraced by the grooves and thereby retaining the key members in their keyseats. The grooves $y$ are formed in the semi-cylindrical transmission portions of the key members and have open ends at the flatter portions of the latter, so that when the key members are oscillated sufficiently they may be slid axially past the projections until the latter coincide with these grooves whereupon the parts can be interlocked by oscillating the key members until the grooves engage the projections. With this arrangement when the operator E is removed each key member may be oscillated out of engagement with the screws $z$ and may be axially slid out of the driving member F and the driver H without separating the latter.

As shown, for further assuring radial retention of each key member in its keyseat in the preferred form of my invention I also provide retention provisions for each end of the over-run key member L', as shown by forming each end of the driver member H with an open ended groove $a'$ in communication at each end with its transmission periphery $a$ and concentric of the axis of its keyseat $b$, and provide the sector S and a complementary washer S' with an axial projection $b'$ entered within this groove, and engaged therewith in such manner that when the key member L' is oscillated until the projections $b'$ clear the inner periphery $a$ of the driver H the key member L' may be removed from its keyseat $b$ after it has been slid axially outward of the driving member F, for permitting which the sector S and the washer S' are slidably fitted on the inner portions of the key member L', so that the latter may be slid from engagement with their sockets. In this manner radial retention of the key member is assured while axial removal thereof is permitted.

The yieldable connection I may be any suitable connection designed to transmit a normal torque load between a driving and a driven member, but according to another feature of its preferred form my present invention provides an annular chamber V around the driver H and within the member G, by radially spacing these members by means of the operators E and E', and forms the yieldable connection I as a substantially circular element of radially limited dimensions, axially slidable into and out of this chamber, and with circumferentially separable ends having the one a provision adapted to be circumferentially fixed to the outer periphery of the driver member and the other a provision adapted to be circumferentially fixed to the inner periphery of the driven member, in such manner that torque may be yieldably transmitted from one member to the other and the no torque relative positions of the members may be definitely defined, and that the ends of the yieldable connections will be interengaged to define its radial dimensions and to limit its contractive movement so that its size will be limited to that size fittable within and removable from the chamber provided for it without impairing its yieldability to torque exceeding the minimum defined by its interlocked ends. As shown the yieldable connection I comprises a pair of spiral springs $c'$ of major torque resistance, having fastening provisions $d'$ on their adjacent ends, which provisions are axially slidable into undercut keyways $e'$ in the opposed peripheries of the driver H and driven member G, and are shown as opposed channels or grooved keys, the flanges of which are interlockable and resistant to circumferential or radial expansion of the yieldable member I for defining its size when removed, and the relation of the driver and driven members during no transmission.

As shown the ends of the springs $c'$ are slidably connected to their keys $d'$ by screw threaded bolts $f'$, carrying minor torque springs $g'$, adjustable by nuts $i'$, by setting which up until the springs $g'$ set, the major torque of the spring $c'$ may be utilized, or by releasing which the minor torque of the springs $g'$ may be preliminary to or supplement the torque of the spring $c'$.

For convenience in axial application or removal of a yieldable element $c'$, one end of each of its key members $d'$ is axially extended and provided with an engagement provision or hole $j'$, for engagement by a suitable removal tool (not shown) by which it may be positioned within or removed from the space between the driver and the driven members. The extended end of one key d' is shown as staggered relatively to that of the other, for permitting manipulation of the yieldable member from either side.

According to another feature of improvement the yieldable connection I is made of two or more yieldable elements, each of less width than the length of the chamber V, which are similarly constructed to that described, and are disposed in multiples in axially spaced relation in the chamber in such circumferential relation that one will counterbalance another during rotation, as shown by providing diametrically opposite keyways e' at the inner and outer sides of the chamber V, and by connecting the key members d' of one element with one pair of said keyways and the key members d' of another element with a diametrically opposite pair of said keyways.

Another feature of improvement in the construction shown utilizes the radial space between the adjacent ends of the spiral spring c' as a clearance space for location and manipulation and operation of the bolts f' and springs g', and for relative circumferential movement and radial interlocked engagement of the key members d', whereby all parts of each spring c' may be disposed within the radial dimensions of its annular formation without preventing adjustment of its minor torque provisions g', or of its major torque provisions c', relatively to its key provisions d'. By this arrangement a plurality of complementary interchangeable elements may be mounted in the chamber V to suit the desired torque.

Another feature of improvement consists in making the yieldable element I as a substantially annular or ring shaped member comprising axially slidable circumferential engagement provisions, in circumferential abutment relation and connected by the adjacent radially spaced ends of a spirally arranged yieldable element with their abutment provisions disposed in the space between said ends and radially interlocked in said space, for defining the dimensions of this annular member and limiting these to those of an annular chamber designed to receive and cooperate with it. In this construction the ring shaped member is sold as an article of manufacture assembled in substantially the form shown in Fig. 12.

According to another feature of improvement in the construction shown as its preferred form my present invention makes a torque responsive clutch assembly in the form of an annular member enclosing between its inner and outer peripheries a driver member intermediate the driving and driven members, a yieldable connection designed to transmit a normal torque load, in operative relation to two of said members, oscillatory clutch means in operative relation to and for controlling transmission between two of said members, torque responsive means rotatable with one of said members and in operative relation to said clutch means, for torque control of said transmission, manual starter means for starting said transmission, and manual arrester means for terminating said transmission, said assembly having removably engageable drive engagement provisions at its inner periphery, for attachment to a rotation transmission member, and having external drive engagement provisions for axially removable connection with another rotation transmission member, and adapted to constitute a self contained torque operated clutch axially applicable to and removable from other transmission members.

As shown in Fig. 1 this annular cartridge assembly is adapted to slide over the periphery of a shaft J and to slide into the inner periphery of a cylindrically bored gear M, which is shown as cup shaped and revolubly mounted on the shaft J, and as axially removably fastened to the clutch A by bolts k', and as circumferentially keyed to the member G by a key l'. In this construction the clutch A is sold as an article of manufacture in the form shown in Fig. 11.

In its preferred form my invention also provides for circumferential adjustment of the resetter nose j relatively to the operator E, and this is accomplished in the construction shown by extending the inner end of the hub h of the operator E in the form of a ring n', which is shown as having circumferentially extended slots o' adjustably connected by screws p' to the end of the hub h, in such manner that the nose j may be adjusted relatively to the operator E.

As shown the ring n' has two notches q', in one of which the nose j is pivoted for use with torque in one direction and in the other of which it may be pivoted when reversed for use with torque in the other direction, and the nose and its spring l and its stop screw k are shiftable from one to another of the notches q' in the ring n', so that when the cam rings O are reversed the nose j may also be reversed and both may cooperate for oscillation and counteroscillation when torque is reversed.

As thus far described my improvements are available for torque oscillation of the key member from inwardly of its axis, but in its preferred form as shown my invention also provides for torque oscillation of the key member from outwardly of its axis when this is desired, and for alternately utilizing one or the other of such methods of oscillation and then inoperatively disposing the provisions for the unused method when the other is being used.

This may be accomplished by any suitable means and is accomplished in the preferred construction shown by mounting a reverse motion pinion W on the inner end of the driver H and in operative relation to and outwardly of the axis of the key member L, and in operative relation to and inwardly of a torque operated provision X carried by and within the operator E' and operable upon movement of the latter relatively to the driver H to rotate the outer periphery of the pinion W in the direction of torque so that the inner periphery of the pinion W will oscillate the semi-cylindrical transmission portion of the key member L reversely to the direction of torque and into its drive disengagement position upon overload. As shown the inner end of the key member L is provided with circumferential teeth p in engagement with the reverse motion pinion W inwardly of its axis, and the provision X is provided with internal teeth v' engageable with the teeth of the reverse motion pinion W outwardly of its axis, whereby, during such engagement, movement of the provision X will be translated into reverse movement of the semi-cylindrical portion of the key member L, whereby such portion will be oscillated reversely to and during movement of the member X, and the key member will thereby be drivingly disengaged upon overload, and will be counter-oscillated during torque surges incident to normal load.

In this construction my invention provides disengagement means, shown as the pin or cam Y on the pinion W and rotatable into disengagement relation to a cam u' on the rack X when the key member L is oscillated into drive disengagement position, whereby to disengage the rack and permit the yieldable connection I to retract the rack and the operator E' without their tending to counter-oscillate the key member when torque ceases, and to hold the rack X out of engagement with the pinion W when the key member L is unlocked, so that the latter may be free from the rack X to be manually operated for resuming transmission.

By this arrangement the key member may be torque oscillated and counter-oscillated and may be manually engaged by the starter B for starting transmission, and may be manually disengaged by the provision C for terminating transmission, as freely as before described, and will be subject to torque operation during normal torque and upon overload.

As shown the rack X is of channel shaped cross-section, and is provided with the number of teeth v' necessary to effect the desired oscillation of the key member L, and with toothless slideways r' at each end of these teeth, designed to ride on the teeth of the pinion W at the limit of desired oscillation, and thereby to supplement the function of the cam Y in throwing the operator X into inoperative relation to the pinion W.

The outwardly disposed oscillation provisions are shown as held in their inoperative positions in Figs. 1 and 7 by a screw s', by unscrewing which the rack X may be yieldably pressed by a spring t' into operative relation with the pinion W when it is desired to oscillate the key member L from outwardly of the peripheries a as an alternative to oscillating the key member from inwardly of said peripheries, as when the inner oscillation provisions have been moved out of operative relation as shown in Fig. 25, so that one method of oscillation may not interfere with the operation of another method.

In the fragmentary cross-section of Fig. 1 shown in Fig. 7, and looking toward the inner end of the key member L, the latter is shown in the same drive engagement position it occupies in Figs. 1 and 2, and the pinion W and cam Y are shown in their corresponding positions, in which the cam Y is lowered sufficiently to permit engagement of the rack X with the teeth of the pinion W, and the rack X is shown as held out of its engagement position by the screw S', because in the construction shown in Fig. 1 the inner oscillation provisions are in operative relation to the key member L, for which reason the latter should be free to be oscillated by the inner provisions without molestation from the rack X.

Fig. 8 is a view similar to Fig. 7, but shows the rack X after it has been released sufficiently by its screw s' to permit it to move into operative relation to the pinion W, and in its normal torque position relatively to the latter incident to drive engagement of the key member L. In this position the key member has rotated the pinion W until its cam Y is lowered and out of engagement with the rack X, one of the toothless portions r' of which is then resting slidably on and in lost motion relation to the teeth of the pinion W, so that the key member is free in its drive engagement position without molestation from the rack X. Normal torque oscillation of the key member will rotate the pinion W and move its cam Y toward but not into engagement with the rack X, and into the position shown in Fig. 9, which shows the rack X as having been moved by normal torque movement into oscillatorily operative relation to the pinion W, and operable to oscillate and counter-oscillate the key member L with minor fluctuations of torque, and to oscillate the key member out of drive engagement and into the position shown in Fig. 10 upon overload. Such oscillation of the key member out of drive engagement moves the cam Y into operative relation with a cam flange u' on the rack X, and thereby lifts the latter out of operative relation to the teeth of the pinion W, and permits the rack to slide inoperatively circumferentially of the pinion and thereby to resume its no torque position without exerting any counter-oscillation effect on the pinion or on the key member when the latter becomes disengaged. The cam Y, cam provisions u', and the toothless slidable portions r', and the teeth v', of the rack should be disposed with precision dimensions and relation adapted to oscillate the key member during drive engagement of the latter, and to terminate such oscillation at the instant of its drive disengagement, and at the latter instant to maintain the rack out of operative relation with the pinion W until the key member has been again oscillated into drive engagement position, and should be arranged to prevent oscillation engagement between the rack X and the key member L during no torque, so that the key member may then be adapted for manual engagement without interference from its torque control provisions.

In order that this outer oscillation means may be availed of with either direction of torque, the rack X is shown as reversibly mounted on the operator E', and its teeth v' are disposed so that they will be operative in either of its positions, and the cam Y and the teeth p on the key member L are adapted to permit oscillation of the latter into drive engagement in either direction.

In operation the clutch A will be assembled as shown in Fig. 1, or as shown in Fig. 26 to suit the direction of torque to be transmitted, and will be adjusted to place in operative position the torque responsive clutch operator means to be used for oscillating the transmission key member. If the key member is to be oscillated from inwardly of its axis the oscillation means outwardly thereof will be fastened out of operative position as shown in Fig. 1 by adjusting the screw s' to the position shown in Fig. 7, and if the key member is to be oscillated from outwardly of its axis the oscillation means inwardly thereof will be fastened out of operative position, as shown in Fig. 25, by adjusting the rings O circumferentially to their hubs h and h', until the cams g of these rings and the nose j carried by the left hand one of these rings shown in Fig. 1, are out of operative relation to the key member L and its re-setter pin i, as shown in Fig. 25, in which the screws p2 of the rings O have been moved in the slots o2 in the hubs h and h' until the cam faces g of these rings cannot oscillate into engagement with the key member L, and the nose j cannot oscillate into engagement with the pin i, in which position the rings O are set on the hubs h and h' by tightening the screws p2, after which by loosening the screw s', as shown in Figs. 8 and 9 the oscillation means outwardly of the axis of the key member may be moved by the spring t' into operative relation with the pinion W, for oscillating the key member from outwardly of its axis.

A yieldable connection of one or more elements, to suit torque desired, will be chosen and one or more elements disposed to suit the direction of torque will, after adjustment to the sensitiveness desired, be inserted in the chamber between the driver and driven members.

The members and clutch means will be held in concentric position by the operator E' while the operator E is detached for permitting this adjustment and assembly, after which the operator E will be applied for positioning and enclosing the internal parts, whereupon the clutch may be slid on or over and drivingly connected to a concentric transmission shaft, and fitted within and drivingly connected to a cylindrical bore or against the side face of any concentric transmission member rotatable relatively to the shaft.

Before use the clutch constitutes a complete torque responsive clutch assembly of substantially annular shape and ready to apply to conventional transmission members. Transmission through the clutch will be started by the starter provision B, and arrested by the brake provision C, and torque control of the clutch will be effected by the oscillation and counter-oscillation provisions during relative movement between the torque operators E and E' and the transmission key member L. The key members will be radially retained in all their oscillation positions.

For reversal of torque the oscillation provisions will be reversed and disposed as before described.

Drive engagement of the transmission key member may be manually or torsionally effected during approach of its keyway and will be permitted by the yieldable connection between the transmission key member and the over-run prevention key member, engagement of which latter may thus await completion of coincidence between its keyseat and its keyway.

The elements of the yieldable connection will be disposed in counter-balanced relation, and each will be radially and circumferentially confined or caged within its predetermined dimensions for application to the annular space provided for receiving it. These elements and their assembly will constitute essentially an annular shaped article of defined dimensions comprising elements of relatively different torque resistance and provisions for minor adjustment of torque, having relatively movable adjacent ends provided with internal and external circumferential attachment means respectively.

The various elements of the clutch may be axially separated or assembled, either torque operator may be removed without disturbing the other assembled parts, and the inner torque oscillation provisions may be relatively circumferentially adjusted as desired.

It will be understood that my invention is not limited to the particular details of construction, arrangement, proportions, shapes, combination of features, or use, set forth as illustrating the preferred form for availing of my invention, since my improvements can be availed of, in whole or in part, according to such modifications of any of these as circumstances, or the judgment of those skilled in the art, may dictate, without departing from the spirit of the invention.

One such modification is illustrated diagrammatically in Figs. 19 and 20, of which Fig. 19 shows fragmentarily the end of a driver member H, having diametrically opposite keyseats b, around a driving member F, having diametrically opposite keyways c which have half way attained coincidence with the keyseats respectively, and a transmission key member L which has been turned into its drive engagement position in an approaching keyway, and an over-run prevention key member L' which is held in disengagement position by the periphery a of the driver F pending coincidence of the adjacent keyway c with the keyseat b in which the member L' is mounted, in which construction the key members are yieldably connected by a modified form T2 of the yieldable connection for the over-run key member, this modified form comprising a spring slidably inserted through the key members and torsionally transmitting stress from the transmission key member when it is locked into engagement position, to the over-run key member while its engagement is prevented, which spring exerts a tension to engage the key member L' with its keyway when the latter attains coincidence with the key member L'. Fig. 20 is a similar view showing the position of the spring T2 after such coincidence has permitted it to lock the over-run key member into its keyway, after which the spring T2 may simultaneously oscillate both key members during torque oscillation of the transmission key member. In such arrangement when the transmission key member is disengaged disengagement of the over-run key member will be effected by contact of the periphery a of the driving member with the inner portion of the over-run key member, which will be thereby oscillated into disengagement position if the spring T2 has not completely effected such oscillation.

Another such a modification is shown in Fig. 21, which is a fragmentary end elevation of a driver member H and driving member F having diametrically opposite keyseats and keyways drivingly engaged by diametrically opposite transmission keys L which are simultaneously oscillatory in the same direction, each of which has an oscillation projection or pin i2 by which it may be oscillated and counter-oscillated during torque surges, which pin is swingable into and out of the notch or recess O2 between the spaced ends of an oscillator pawl f2 and a counter-oscillator pawl j2, both of which are elastically yieldably carried by the hub of a torque operator E2, and which are duplicated at diametrically opposite sides thereof, and cooperable with the pins i2 during relative movement of the key members and the operator, in such manner that the pawls j2 will oscillate the key members toward their drive disengagement position during torque surges, and the pawls f2 will counter-oscillate the key members during diminution of such surges, and upon overload the pawls j2 will drivingly disengage the key members by oscillating the pins i2 out of cooperative relation to the pawls j2 and f2, whereupon with termination of torque these pawls and the key members may resume their no torque positions, without effecting further oscillation. For terminating this the nose of the pawls j2 is adjusted to oscillate in an arc which just clears the point of the pin i2 when it is unlocked, and the nose of the pawl f2 is slightly inwardly of the point of the pin i2 when it is in its unlocked position, and for permitting oscillation of the pin i2 past the noses of the pawls so that it may engage in the recess O2 between them, each of the pawls is shown as radially yieldably mounted. This construction can be used where torque controlled over-run prevention is not required.

Another such a modification is shown in Figs. 22 and 23, which are diagrammatic fragmentary end elevations showing a driven member G3, driver member H3, yieldable connection I3, and driving member F, with a key member L3 which is shown in drive engagement position in Fig. 22 and in drive disengagement position in Fig. 23. The key member L3 is shown as having oscillation provisions or teeth $p$ at its semi-cylindrical transmission portion, engaged by similar provisions on the inner end of a segment lever W3, which is fulcrumed to the driver H3, and has an outer end which swings to a major extent in an arc which intersects an arc traversed by an oscillator X3, and to a lesser extent intersects an arc traversed by a counter-oscillator Z3. The oscillators X3 and Z3 are shown as radially and circumferentially adjustably carried by the driven member G3 and are circumferentially movable therewith relatively to the driver H3 during torque surges, and the oscillator X3 is adjusted so that as it moves with torque it will engage the point of the lever W3 and oscillate such point in the direction of torque, which will cause the sector to oscillate the transmission portion of the key member L3 reversely to such direction, and into drive disengagement position upon overload as shown in Fig. 23. The counter-oscillator Z3 is adjusted slightly outwardly of the point of the oscillator X3, in such manner that the counter-oscillator Z3 will not engage the lever W3 when the latter is in its full drive engagement or its drive disengagement positions, but will engage the lever W3 intermediate said positions during diminution of torque, and thereby will counter-oscillate the key member L3 toward its normal drive engagement position, and thus re-set it after it has been oscillated by a torque surge. For accomplishing this the arcs traversed by the oscillators X3 and Z3 are concentric but of different radii, and the arc traversed by the point of the lever W3 is of much less radius than and intersects both said arcs sufficiently so that the oscillator X3 may oscillate the key member out of drive engagement and the oscillator Z3 may only counter-oscillate it in lesser degree. The oscillator X3 and counter-oscillator Z3 are shown as so spaced when in their no torque positions that they do not molest manual setting of the key member L3, and the point of the lever W3 is so disposed that when it is in its position for complete drive engagement it will just intersect the arc for the operator X3 and may be engaged by the latter and be torque oscillated thereby toward and into its drive disengagement position as shown in Fig. 23, during which oscillation this point intersects the arc traversed by the counter-oscillator Z3 by which it may counter-oscillate during such intersection until it has almost but not quite reached its drive termination position, at which the point of the lever W3 has been moved inwardly of the arcs as traversed by both oscillators, so that neither of the latter can re-set the key member after termination of transmission.

Fig. 24 is a fragmentary end elevation similar to Fig. 22, but showing another modification in which the member G4 is a driving member, with a yieldable connection I4 adapted to yield circumferentially on a driver member H4, and the member F4 is a driven member. In this construction the key member L4 is shown as having a notch or recess w4, engaged by the inner end of a lever W4, fulcrumed to the driver H4 and having an outer end oscillating in an arc making a major intersection of the arc through which the point of an oscillator X4 revolves, and intersecting to a minor extent the arc through which a counter-oscillator Z4 revolves, as they move with the driving member G4, in such manner that when the driver H4 oscillates circumferentially of the driving member G4 during torque the point of the lever W4 will engage and be oscillated by the oscillator X4 for oscillating the key member L4 toward its drive disengagement position, and when the driver H4 recedes with diminution of torque the point of the lever W4 will engage the counter-oscillator Z4 and be counter-oscillated thereby. This construction operates on a similar principle to that described with reference to Figs. 22 and 23, except that because the member G4 is a driving member, as to which the driver H4 lags with increase of torque, the lever W4 moves toward the oscillators X4 and Z4 during variations in torque, instead of the oscillators moving toward the lever.

Circumferential and radial adjustments of the arcs traversed by oscillation provisions disposed inwardly of the axis of the key member are best accomplished in the manner described with reference to Figs. 1, 2, 3 and 4 for the cam ring O, pin $i$ and nose $j$, but when such adjustments are desired for oscillation provisions disposed outwardly of the axis of a key member, I prefer to effect them as shown in Figs. 22, 23 and 24, in which the oscillators X3 and X4 and Z3 and Z4 are shown as radially adjustably screwed through oscillatorily mounted posts $x'$ in such manner that each can be screwed in or out to vary the radius of the arc traversed by the oscillator, or turned to circumferentially vary the length of such arcs, and in which the reverse motion oscillators W3 and W4 are shown as having a radially adjustable point $y'$ which can be screwed in or out to vary the radius of the arc traversed by this point, for radially varying the extent to which the arc traversed by this point shall penetrate the arcs traversed by said oscillators, and thereby to circumferentially vary the extent of intersection of said arcs. Where such adjustability is not required the extent of intersection of the arc desired to be traversed by the point of the oscillator W3 is initially determined by apportioning the relative radii of its inner gear portion and its outer point to suit the oscillation of the latter across the arcs of oscillation of the oscillators X3 and Z3 to that desired. In Figs. 22 and 23 the radii of the point and the toothed portion of the oscillator W3 are shown as not relatively different, because identical radii in this instance gives an arc of travel for the point which affords the desired radial and circumferential intersection to the arcs traversed by the operators X3 and Z3 for effecting and controlling oscillation and escapement from oscillatory relation of the parts on principles somewhat analogous to those used for escapement movements in time pieces. The posts $x'$ are shown as locked in their positions of circumferential adjustment frictionally and by screws $z'$.

As shown in Fig. 18 the counter-oscillation means $j$ is oscillatory in an arc struck from a centre other than and materially spaced from the axis of the key member L, and having a radius intersecting the arc of oscillation of the latter.

The bolts $f'$ and nuts $i'$ are disposed intermediate the major and minor radii of the spring $c'$ and movably connect its ends to their keys $e'$.

What I claim is:

1. In rotation transmissions comprising, a rotary driving member, a driver member, a driven member rotatable with said members, for transmitting rotation therefrom, and non-rotary relatively to said driving member upon termination of said transmission, a yieldable drive connection in operative relation to two of said members, designed to transmit a normal torque load, two of said members relatively revoluble upon said termination, and having reciprocal faces the one having a keyseat and the other a keyway reciprocal to said keyseat, clutch means rotatable with said driving member during said transmission, oscillatory into said keyseat, for terminating said transmission, and oscillatory across said faces and into said keyway for effecting said transmission, operator means carried from and rotatable with said driven member during said transmission, said clutch means and said operator means the one movable relatively to the other upon overload of said yieldable connection, and operating said clutch means and terminating said transmission upon said overload; the combination therewith of motion reversal means carried from and revoluble with said driven member during said transmission, and revolubly connectable and disconnectable with said driving member operated by said relative movement of said clutch means and said operator means and constructed and arranged during said relative movement to oscillate said clutch means into said keyseat, and to drivingly disengage said clutch means and terminate said transmission upon said overload.

2. In rotation transmissions comprising, a rotary driving member, a driver member, a driven member rotatable with said driver member, for transmitting rotation therefrom, one of said members movable relatively to another during said transmission, a yieldable drive connection in operative relation to two of said members, designed to transmit a normal torque load, two of said members relatively revoluble upon termination of said transmission, and having reciprocal faces the one having a keyseat and the other having a keyway reciprocal to said keyseat, clutch means oscillatory into said keyseat, for terminating said transmission, and oscillatory across said faces and into said keyway for effecting said transmission, and clutch operator means rotatable with one of said members during said transmission, said clutch means and said operator means the one movable relatively to the other upon overload of said yieldable connection, and operating said clutch means and terminating said transmission upon said overload; the combination therewith of coincident provisions for oscillating said clutch means, carried by said operator means and said clutch means respectively, disposed in coincidence with said faces during said termination, one oscillatorily across said faces during said transmission, and the other circumferentially oscillatory in coincidence with said faces, said provisions being co-operable during said relative movement, and constructed and arranged during said relative movement to oscillate said first provision into coincidence with said faces upon said overload, and to oscillate said clutch means into said keyseat and terminate said transmission upon said overload.

3. In a rotation transmission comprising, a rotary driving member, a driver member, a driven member rotatable with said driver member, for tansmitting rotation therefrom, one of said members movable relatively to another during said transmission, a yieldable drive connection in operative relation to two of said members, designed to transmit a normal torque load, two of said members having reciprocal faces the one having a keyseat and the other having a keyway reciprocal to said keyseat, a semi-cylindrical oscillatory key member having a semi-cylindrical transmission portion oscillatory about an axis in said keyseat, for terminating said transmission, and having a flatter portion coincident with said faces during said termination, and oscillatory across said faces and into said keyway for effecting said transmission, and clutch operator means rotatable with one of said members during said transmission, said clutch means and said operator means the one movable relatively to the other upon overload of said connection, for operating said key member and terminating said transmission upon said overload, said key member and said operator means having reciprocal oscillation provisions for oscillating said key member, one of said oscillation provisions comprising said flatter portion, and the other of said provisions disposed in an arc approximately intersecting the axis of said key member, one of said provisions being movable relatively to the other thereof in said arc during said relative movement, said provisions being interengageable substantially in the plane of said axis upon said overload, and constructed and arranged to oscillate said key member into said keyseat and out of drive engagement position upon said overload.

4. In a transmission comprising, a rotary driving member, a driver member, a driven member rotatable with said driver member, for transmitting rotation therefrom, one of said members movable relatively to another during said transmission, a yieldable drive connection in operative relation to two of said members, designed to transmit a normal torque load, two of said members relatively revoluble upon termination of said transmission, and having reciprocal faces the one having a keyseat and the other having a reciprocal keyway, clutch means having a transmission portion oscillatory in said keyseat for terminating said transmission, and having a flatter portion coincident with said faces during said termination and oscillatory across said faces and into said keyway for effecting said transmission, and clutch operator means rotatable with one of said members during said transmission, said clutch means and said operator means the one movable relatively to the other upon overload of said connection, and operating said clutch means and terminating said transmission upon said overload, said clutch means and said operator means having reciprocal circumferentially approachable oscillation provisions for oscillating said key member, the one oscillatory into coincidence with the other upon termination of said transmission, and the other of said provisions comprising a circumferentially extended cam portion having a periphery coincident with said first provision during said termination, engageable with said first provision during said relative movement and constructed and arranged to oscillate said flatter portion into coincidence with said faces and to limit said oscillation to said coincidence upon said overload, and to terminate said transmission and resist further oscillation of said clutch means upon said overload.

5. In a transmission comprising, a rotary driving member, a driver member, a driven member rotatable with said driver member, for transmitting rotation therefrom, one of said members movable relatively to another during said transmission, a yieldable drive connection in operative relation to two of said members, designed to transmit a normal torque load, two of said members relatively revoluble during termination of said transmission, and having reciprocal faces the one having a keyseat and the other having a keyway reciprocal to said keyseat, clutch means oscillatory in said keyseat for terminating said transmission, and oscillatory across said faces into said keyway for effecting said transmission, and clutch operator means rotatable with one of said members during said transmission, said clutch means and said operator means the one movable relatively to the other upon overload of said connection, and operating said clutch means and terminating said transmission upon said overload, and said clutch means and said operator means having reciprocal oscillation provisions comprising reciprocal similarly arc shaped faces carried by said clutch means and said operator respectively, one of said arc shaped faces oscillatory across the arc of the other during said transmission and into coincidence with said arc upon said overload, and the other of said arc shaped faces circumferentially engageable with the first, and co-operable therewith during said relative movement, and constructed and arranged to torque responsively oscillate said clutch means out of said keyway and into drive disengagement position upon overload of said yieldable connection.

6. In rotation transmissions comprising, a rotary driving member, a driver member, a driven member rotatable with said driver member, for transmitting rotation therefrom, one of said members movable relatively to another during said transmission, a yieldable drive connection in operative relation to two of said members designed to transmit a normal torque load, two of said members relatively revoluble during termination of said transmission, and having reciprocal faces having the one a keyseat and the other a reciprocal keyway, transmission termination clutch means oscillatory in said keyseat for terminating said transmission, and oscillatory across said faces and into said keyway for effecting said transmission, and clutch operator means rotatable with said driving member during said transmission, said clutch means and said operator means the one movable relatively to the other upon overload of said yieldable connection, and operating said clutch means and terminating said transmission upon said overload; the combination therewith of torque responsive clutch oscillator means torque actuatingly oscillatory said clutch means in two directions, in operative relation to said clutch means and said operator means, rotatable with said members during said transmission, revolubly connectable and revolubly disconnectable with one of said members and as to which the latter is relatively revoluble during said termination, movable in response to and moved by the movement of said yieldable connection, co-operably engageable and constructed and arranged during said movement to move said clutch means toward its transmission termination position upon yield of said yieldable connection in response to increase in said normal torque load, and to torque responsively oscillate said clutch means into said keyway coincidently with movement of said yieldable connection in response to diminution in said normal torque load.

7. In the transmission specified in claim 3, said oscillation provisions being constructed and designed to initially interengage adjacent the edge of said flatter portion of said clutch means, and to subsequently interengage successively adjacent surfaces of said flatter portion, and constructed and arranged to successively modify oscillation of said clutch means during said relative movement of said oscillation provisions.

8. In rotation transmissions comprising, a rotary driving member, a driver member, a driven member rotatable with said driver member, and transmitting rotation therefrom, one of said members movable relatively to another during said transmission, a yieldable drive connection in operative relation to two of said members, designed to transmit a normal torque load, two of said members having reciprocal faces, having the one a keyseat and the other a keyway, transmission termination clutch means oscillatory in said keyseat for terminating transmission, and oscillatory across said faces and into said keyway for effecting said transmission, and clutch operator means rotatable with said driving member during said transmission, said clutch means and said operator means the one movable relatively to the other upon overload of said yieldable connection, and operating said clutch means and terminating said transmission upon said overload; the combination therewith of an adjustable clutch oscillator provision in adjustable operative relation to said clutch means and adjustably connected to said operator means, rotatable with said driver member during said transmission, movable relatively to and co-operable with said clutch means upon overload of said yieldable connection, to oscillate said clutch means into drive disengagement position, and adjustable relatively to said operator means, for controlling said termination.

9. In rotation transmissions comprising, a rotary driving member, a driver member, a driven member rotatable with said driver member, for transmitting rotation therefrom, one of said members movable relatively to another thereof, a yieldable drive connection in operative relation to two of said members, designed to transmit a normal torque load, two of said members having reciprocal faces one having keyseats and the other having reciprocal keyways, transmission clutch means having a transmission portion oscillatory in one of said keyseats, for terminating said transmission, and having another portion coincident with said faces during said termination, and oscillatory across said faces and into one of said keyways for effecting said transmission, and torque responsive clutch operator means rotatable with said driving member during said transmission, said clutch means and said operator means the one movable relatively to the other upon overload of said yieldable connection, and operating said clutch means and controlling said transmission; the combination therewith of yieldably operated over-run prevention clutch, means in operative relation to the others of said keyseats and keyways and two of said members, for resisting over-run of one thereof relatively to the other thereof, in yieldable operative relation to said transmission clutch means and yieldably connected with said torque responsive operator means.

10. In rotation transmissions comprising, a rotary driving member, a driver member, a driven member rotatable with said driver member, for transmitting rotation therefrom, one of said members movable relatively to another during said transmission, a yieldable drive connection in operative relation to two of said members, designed to transmit a normal torque load, two of said members having reciprocal faces, having the one keyseats and the other reciprocal keyways, transmission clutch means having a transmission portion oscillatory in one of said keyseats, for terminating said transmission, and having another portion coincident with said faces during said termination, and oscillatory across said faces and into one of said keyways for effecting said transmission, and torque responsive clutch operator means rotatable with said driving member during said transmission, said clutch means and said operator means the one movable relatively to the other upon overload of said yieldable connection, for termination of said transmission; the combination therewith of over-run prevention clutch means having a portion oscillatory in the other of said keyseats, for preventing over-run of said driver member, and having a flatter portion coincident with said faces during said termination, said over-run prevention clutch means being in lost motion operative relation to said torque responsive operator means.

11. In rotation transmissions comprising, a rotary driving member, a driver member, a driven member, one of said members movable relatively to another during said transmission, a yieldable drive connection in operative relation to two of said members, designed to transmit a normal torque load, two of said members having reciprocal faces, having the one a keyseat and the other a keyway, clutch comprising a key member means oscillatory in said key seat, for terminating said transmission, and oscillatory across said faces and into said keyway for effecting said transmission, and clutch operator means rotatable with said driving member during said transmission, said clutch means and said operator means the one movable relatively to the other upon yielding of said yieldable connection, and oscillating said clutch means from its full drive engagement position partially toward its drive disengagement position, and permitting such transmission during normal torque load, and oscillating said clutch means into its drive disengagement position upon overload of said yieldable connection; the combination therewith of torque responsive torque counter-actuated counter oscillation means in operative relation to said clutch means and torque actuatingly oscillating said clutch means circumferentially into said keyway and toward its drive engagement position coincidently with diminution of torque during normal torque load, rotatable with said members during said transmission, and revolubly disconnectable from one of said members and as to which one of the latter is relatively revoluble upon said termination, and constructed and arranged to torque actuatingly re-set said clutch means counter to said first oscillation of the latter.

12. In a rotation transmission comprising, a rotary driving member, a driver member, a driven member rotatable with said driver member, for transmitting rotation therefrom, one of said members movable relatively to another during said transmission, a yieldable drive connection in operative relation to two of said members, designed to transmit a normal torque load, two of said members relatively revoluble upon termination of said transmission, and having reciprocal faces the one having a keyseat and the other having a reciprocal keyway, clutch means oscillatory into said keyseat for terminating said transmission, and oscillatory across said faces and into said keyway, for effecting said transmission, and clutch operator means rotatable with one of said members during said transmission, said clutch means and said operator means the one movable relatively to the other upon overload of said connection, and oscillating said clutch means from its full drive engagement position partially toward its drive disengagement position, and permitting such transmission during said normal torque load, and oscillating said clutch means into its drive disengagement position upon overload of said yieldable connection; the combination therewith of circumferentially adjustable counter-oscillation means in operative relation to said clutch means and oscillating the latter into said keyway and toward its drive engagement position coincidently with diminution of torque during said normal torque load, and re-setting said clutch means counter to said first oscillation of the latter, said counter oscillation means being circumferentially adjustably connected to and in circumferentially adjustable operative relation to said operator means, and constructed and arranged to circumferentially adjustably vary said re-setting.

13. In the transmission specified in claim 11, said counter oscillation means comprising a counter oscillation provision carried by and oscillatory with said clutch means and a reciprocal counter oscillation provision carried by and oscillatory with said operator means, said provisions oscillatory respectively through intersected arcs and interengageable in counter oscillatory operative relation between the intersections of said arcs during said normal torque load, and respectively movable out of said interengagement, and into revoluble operative relation beyond one said intersections, and relatively revoluble upon said overload.

14. In the transmission specified in claim 11, said counter oscillation means being disposed inwardly of said clutch means, and being relatively revoluble inwardly of the latter upon said overload.

15. In the transmission specified in claim 11, said counter oscillation means being disposed outwardly of said clutch means, and being relatively revoluble outwardly of the latter upon said overload.

16. In rotation transmissions comprising, a rotary driving member, a driver member, a driven member rotatable with said driver member during said transmission, for transmitting rotation therefrom, one of said members movable relatively to another during said transmission, a yieldable drive connection in operative relation to two of said members, designed to transmit a normal torque load, two of said members having reciprocal faces, having the one a keyseat and the other a keyway, clutch means oscillatory in said keyseat, for terminating said transmission, and oscillatory across said faces and into said keyway for effecting said transmission, torque responsive clutch operator means rotatable with said driving member during said transmission, said clutch means and said operator means the one movable relatively to the other during yield of said yieldable connection, and oscillating said clutch means partially toward its drive disengagement position and permitting said transmission during normal torque load, and into its drive disengagement position, and terminating said transmission, upon overload of said yieldable connection; the combination therewith of torque actuated counter oscillation means in operative relation to said clutch means torque actuating oscillating the latter counter to said first oscillation and toward its drive engagement position torque counter-actuatingly actuated by and in response to movement of said yieldable connection coincidently with and in response to diminution of said normal torque load, and constructed and arranged to torque actuatingly counter oscillate said clutch means into said keyway during said diminution.

17. In rotation transmissions comprising, a driving member, a driver member, said members having reciprocal faces, having the one an open-sided semi-cylindrical keyseat and the other an open sided semi-cylindrical keyway communicating with said keyseat, clutch means comprising a key member having a semi-cylindrical transmission portion oscillatory about an axis in said keyseat, for terminating said transmission, and having a flatter portion coincident with said faces during said termination, and oscillatory across said faces and into said keyway for effecting said transmission, and clutch operator means rotatable with said members during said transmission, and oscillating said key member out of said keyway and terminating said transmission; the combination therewith of radial retention oscillation permission provisions, oscillatorily positioning said key member in said open-sided keyseat and between said driving member and said driver member, comprising a radially retentive overhung provision carried by said keyseated member and an undercut circumferential groove in said key member, and carried by and oscillatory with said key member, said provisions oscillatorily engaged and constructed and arranged to radially retain said key member in said open-sided keyseat and to permit circumferential oscillation of said key member in the latter.

18. In rotation transmissions comprising, a driving member, a driver member, a driven member rotatable with said driver member during said transmission, for transmitting rotation therefrom, one of said members movable relatively to another during said transmission, a yieldable drive connection in operative relation to two of said members, designed to transmit a normal torque load, two of said members having reciprocal faces having the one a keyseat and the other a keyway, transmission termination clutch means oscillatory into said keyseat for terminating said transmission and into said keyway for effecting said transmission, and clutch operator means rotatable with said driving member during said transmission, said clutch means and said operator means the one movable relatively to the other upon overload of said yieldable connection, and operating said clutch means and terminating said transmission upon said overload, said driving, driver and driven members being in concentric relation; the combination therewith of connector means carrying said operator means and common to said members, for connecting the latter, fixed to and revoluble with said driven member, revolubly connected to said driving member and, as to which said driver member and said clutch means are circumferentially movable during said transmission, and as to which said driving member is revoluble upon termination of said transmission, and being non-rotary relatively to said driving member when said clutch means is oscillated into said keyseat during termination of said transmission.

19. In rotation transmissions comprising, a driving member, a driver member, a driven member rotatable with said driver member during said transmission, and transmitting rotation therefrom, one of said members movable relatively to another during said transmission, a yieldable drive connection in operative relation to two of said members, designed to transmit a normal torque load, two of said members having reciprocal faces, having the one a keyseat and the other a keyway, transmission termination clutch means having a transmission portion oscillatory in said keyseat and into said keyway, for effecting said transmission; and torque responsive clutch oscillator means rotatable with said driving member during said transmission, said clutch means and said oscillator means the one movable relatively to the other upon overload of said yieldable connection, and oscillating said clutch means and terminating said transmission upon said overload, said oscillator means and said clutch means the one circumferentially movable relatively to the other during said transmission, and having interengageable co-operable oscillation provisions, oscillating said clutch means out of said keyway and terminating said transmission during said relative movement, said clutch oscillator means being carried from and revoluble with said driven member and being revolubly connected to and revolubly disconnectable from said driving member and non-rotary relatively to said driving member during said termination.

20. In the transmission specified in claim 19, said oscillator means being removably and reversibly applicable to said members.

21. In the transmission specified in claim 19, said oscillator means having an axially extended wall around said clutch means.

22. In the transmission specified in claim 19, said oscillator means having a circumferentially extended cavity of greater extension than said relative movement, and within which said clutch means is extended and oscillatorily movable.

23. In the transmission specified in claim 19, said oscillator means having oscillation limitation provisions in operative relation to said clutch means, and being operable to limit oscillation of the latter.

24. In the transmission specified in claim 19, said oscillator means having reverse motion oscillation provisions in operative relation to said clutch means and being operable to oscillate the latter during said relative movement and in reverse direction thereto.

25. In the transmission specified in claim 19, said oscillator means having counter oscillation provisions in operative relation to said clutch means, and being operable to oscillate the transmission portion of the latter in the direction of torque during said relative movement.

26. In the transmission specified in claim 19, said oscillator means being adjustable relatively to and in adjustable operative relation to said clutch means, and being adjustably operable to oscillate the latter during said relative movement.

27. In the transmission specified in claim 19, said oscillation provisions being around and outwardly of and in operative relation to said clutch means, and being operable to oscillate the latter from around and outwardly thereof during said relative movement.

28. In the transmission specified in claim 19, said oscillator means being annular and having an inner periphery oscillatorily removably fitted over a revoluble transmission member.

29. In a transmission comprising a driving member, a driver member, a driven member rotatable with and transmitting rotation from said driver member during said transmission, and as to which said driving member is relatively revoluble during termination of said transmission, one of said members movable relatively to another during said transmission, a yieldable drive connection in operative relation to two of said members, designed to transmit a normal torque load, two of said members having reciprocal faces having the one a keyseat and the other a keyway, transmission termination clutch means oscillatory in said keyseat for terminating said transmission, and into said keyway for effecting said transmission, and torque reponsive clutch ocillator means rotatable with said driving member during said transmission, said clutch means and said oscillator means the one movable relatively to the other upon overload of said yieldable connection, and oscillating said clutch means and terminating said transmission upon said overload; the combination therewith of manually operable clutch oscillator means, having means for operating it and in operative relation to said clutch means and said members, rotatable therewith and movable relatively thereto revolubly connected to and revolubly disconnectable from said driving member, non-rotary relatively to the latter during said termination and constructed and arranged during said non-rotation to manually oscillate said clutch means into said keyway and manually start said transmission.

30. In rotation transmissions comprising, a driving member, a driver member, a driven member rotatable with said driver member during said transmission, for transmitting rotation therefrom, one of said members movable relatively to another during said transmission, said members concentrically disposed, two of said members having reciprocal faces having the one a keyseat and the other a keyway, clutch means in operative relation to two of said members, and controlling said transmission, and clutch operator means rotatable with said driving member during said transmission, said clutch means and said operator means the one movable relatively to the other, and operating said clutch means and terminating said transmission; the combination therewith of a yieldable drive connection between and disposed concentrically of and in yieldable operative relation to two of said members, designed to transmit a normal torque load, and permitting said relative movement and said operation of said clutch means upon overload, for terminating said transmission upon said overload, revoluble with said driving member during said transmission, revolubly connectable and disconnectable with said driving member, and non-rotary relatively to the latter upon said termination, and constructed and arranged to revolve with and torque responsively transmit torque between two of said members during said transmission, and to permit relative rotation of said driving member upon said termination.

31. In rotation transmissions comprising, a driving member, a driver member, a driven member rotatable with said members during said transmission, for transmitting rotation therefrom, one of said members being movable relatively to another during said transmission, a yieldable drive connection in operative relation to two of said members, designed to transmit a normal torque load, two of said members having reciprocal faces the one having a keyseat and the other a reciprocal keyway, transmission termination clutch means in operative relation to two of said members, oscillatory in said keyseat, for terminating said transmission, and oscillatory across said faces and into said keyway for effecting said transmission, and clutch operator means rotatable with said driving member during said transmission, said clutch means and said operator means the one movable relatively to the other upon overload of said yieldable connection, and operating said clutch means and terminating said transmission upon said overload; the combination therewith of torque responsive co-operable oscillation provisions disposed outwardly of said clutch means, in operative relation to the latter outwardly thereof co-operable during said relative movement and oscillating said clutch means during said transmission, revoluble with said members during said transmission, revolubly disconnectable with said driving member, and as to which the latter is relatively revoluble during said termination, and constructed and arranged to oscillate said clutch means outwardly of the latter during said transmission, and to permit said relative revolution of said driving member upon said termination.

32. In rotation transmissions comprising, a rotary driving member, a driver member, a driven member rotatable with said members during said transmission, for transmitting rotation therefrom, one of said members movable relatively to another during said transmission, a yieldable drive connection in operative relation to two of said members, designed to transmit a normal torque load, two of said members having reciprocal faces the one having a keyseat and the other a keyway reciprocal to said keyseat, clutch means oscillatory in said keyseat, for terminating said transmission, and oscillatory across said faces and into said keyway for effecting said transmission, and clutch operator means rotatable with said driven member during said transmission, said clutch means and said operator means the one movable relatively to the other upon overload of said yieldable connection, and operating said clutch means and controlling said transmission upon said overload; the combination therewith of reversible oscillation means, for said clutch means, rotatable with said members during said transmission, revolubly connected to one of said members, and revolubly disconnectable from the latter upon termination of said transmission, in operative relation to said clutch means, and constructed and arranged when in one position to oscillate said clutch means in response to yield of said yieldable connection in clockwise direction, and when in another position to oscillate said clutch means in response to movement of said yieldable connection in counter-clockwise direction.

GEORGE HOLT FRASER.